3,160,657
ALKALI METAL-AMINE SALT OF HALOHYDRO- CARBYLPHOSPHONIC ACID

James R. Price, Alton, Ill., and Richard G. Cunningham, University Park, Pa., assignors to Shell Oil Company, New York, N.Y., a corporation of Delaware
No Drawing. Original application June 15, 1960, Ser. No. 36,154. Divided and this application Sept. 26, 1963, Ser. No. 311,618
2 Claims. (Cl. 260—501)

This invention relates to a new and novel class of alkali metal-amine halohydrocarbyl phosphonate salts and their use as oil improvers.

The new and novel alkali metal-amine halohydrocarbyl phosphonates of the present invention have the general formula:

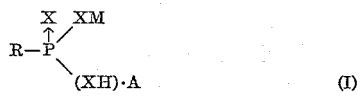

wherein R is a halohydrocarbyl, preferably a middle halogen (Cl or Br) hydrocarbyl such as chloro and/or bromoalkyl, chloro and/or bromocycloalkyl, chloro and/or bromoaralkyl or chloro and/or bromalkaryl radicals having from 1 to 30 and preferably 1 to 10 carbon atoms, X is selected from the group of oxygen and sulfur, M is an alkali metal, e.g. Na or K and A is an amine, preferably a primary or secondary aliphatic amine which may be straight or branch-chain, preferably the latter. A preferred class of compounds represented by Formula I may be represented by the formula:

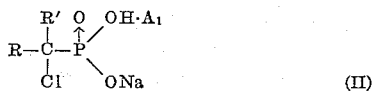

wherein R' represents a middle halogen atom, e.g. Cl or Br, a hydrogen atom or an alkyl group, the total number of carbon atoms in the alkyl group represented by R' being 3, R may be the same as R' or a hydrocarbyl radical of up to 30 carbon atoms, preferably when R is not hydrogen or a middle halogen atom, it is an alkyl radical of 2 to 18 carbon atoms, and A, represents a higher highly branched aliphatic primary or secondary amine, preferably a $C_{8-24}$ highly branched aliphatic primary amine.

The acid portion used to make the mixed metal-amine salts can be prepared by a number of suitable methods such as reported by Arbuzov (Jr. Gen. Chem. USSR; 4, 898–900 (1934)); Coover (Organic Chemical Bulletin, vol. 23, No. 4, 1951), Barnard (Can. Jr. of Chem., vol, 31, p. 976–983, 1953). Suitable chlorohydrocarbylphosphonic acids for preparing the new alkali metal-amine salts include monochloromethylphosphonic acid,
1-monochloroethylphosphonic acid,
1-monochloropropylphosphonic acid,
1-chloro-1-methyl-ethylphosphonic acid,
1-chloro-2-methylpropylphosphonic acid,
1-chlorobutylphosphonic acid,
1-chloro-1-methylpropylphosphonic acid,
trichloromethanephosphinic acid,
trichloromethanethiophosphinic acid,
1,1-dibromoethanephosphinic acid,
3,3,5-trichlorocyclohexanephosphinic acid,
1,1-dichlorohexadecanephosphinic acid,
1,1-dichlorohexadecanephosphinic acid,
trichloromethanephosphinic acid,
1,1-dichloroethanephosphinic acid,
2,2,2-trichloroethanephosphinic acid,
tribromomethanephosphonic acid,
dichloromonobromomethanephosphonic acid,
1,1-dibromobutanephosphonic acid,
1,1-dichlorophenylethanephosphonic acid,
3,3,5-trichlorocyclohexanephosphonic acid,
3,5-dichlorocyclohexanephosphonic acid,
1,1-dichloropropanephosphonic acid,
3,3,3-tribromopropanephosphonic acid,
1,1-dichloroethanephosphinic acid,
1,1-dichlorobutanephosphinic acid,
dichlorophenyl benzenephosphonic acid,
1,1-dichloro-2-monobromobutanephosphonic acid,
1,1-dichlorooctanephosphonic acid,
trichloromethanethiophosphonic acid,
1,1-dibromobutanethiophosphonic acid,
3,3,5-trichlorocyclohexanethiophosphonic acid,
1,2-dichloroethanethiophosphonic acid,
trichloromethaneselenophosphonic acid and the like.

The amines which can be used to form salts of the above phosphorus acids include highly branched primary aliphatic amines or secondary aliphatic amines of at least 8 carbon atoms. Of the highly branched primary aliphatic amines, the tertiary alkyl primary amines are preferred and they can be prepared by any suitable means such as described in the U.S. Office of the Publication Board Report No. 88843. Other highly branched primary amines can be prepared by converting primary branched chain alcohols as produced by the Oxo process from branched chain olefins as fully described by P.W. Sherwood in the Oil and Gas Journal, June 9, 1949, page 71, and in the February 1953 issue of Petroleum Processing, to the corresponding nitriles and converting the nitrile to the amine by catalytic hydrogenation. Another method is to convert alcohols to the corresponding halides and to form the amines derived from the halide in the customary manners such as by reacting with ammonia.

It has been found that the tertiary alkyl primary amines, containing, as the tertiary alkyl radical, the radical of polyisobutylene, polypropylene and mixture thereof are particularly effective for the present purpose and they constitute a preferred class of amines for the practice of the invention. Accordingly, 1,1,3,3-tetramethylbutylamine (from the amination of diisobutylene), 1,1,3,3,5,5-hexamethylhexylamine (from triisobutylene), 1,1,3,3,5,5,7,7-octamethyloctylamine (from tetraisobutylene) and 1,1,3, 3,5,5,7,7,9,9-decamethyldecylamine (from pentaisobutylene) are specific preferred amines, which are suitably used individually or as mixtures thereof. In addition to these tertiary alkyl primary amines, primary tertiaryalkylmethylamines, such as 2,2,4,4-tetramethyl pentylamine, 2,2,4, 4,6,6-hexamethyl heptylamine and the like are suitable.

Other tertiary branched-chain alkyl primary amines which can be used include the $C_8$ and higher amines of this type mentioned in U.S. Patents 2,160,058, 2,606,923 and 2,611,782, such as tert.-tridecylamine

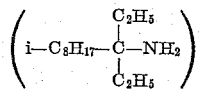

as well as isoheptyldiethylcarbinyl amine, isooctylethylpropylcarbinylamine, and the like. Primary amines of this type are commercially available from Rohm & Haas Company under the trade name of "Primenes," specific products being "Primenes 81–R," which is a mixture of primary alkylamines containing from about 12 to 15 carbon atoms and "Primene JM–T," which is a similar tertiary alkylamine mixture containing an average of about 18 to 24 carbon atoms.

The following are the properties of some amines which can be used to form the amine salts.

TABLE I
Properties

| | Tertiary-Octylamine | Alkylamine 81-R A₁ | Alkylamine JM-T A₃ |
|---|---|---|---|
| Formula | $t\text{-}C_8H_{11}NH_3$ | Principally $t\text{-}C_{12}H_{25}NH_2$ to $t\text{-}C_{14}H_{31}NH_2$. | Principally $t\text{-}C_{18}H_{37}NH_2$ to $t\text{-}C_{24}H_{49}NH_2$. |
| Molecular Weight | 129 | Principally 171–213 | Principally 269–353. |
| Average Molecular Weight | 129 | 191 | 301. |
| Specific Gravity, 25° C | 0.771 | 0.813 | 0.828. |
| Refractive Index, 25° C | 1.423 | 1.423 | 1.455. |
| Boiling Point (or range) | 137–143° C. (760 mm.) | 5–90% at 210–227° C. (760 mm.) | 5–95% at 275–340° C. (785 mm.). |

The secondary amines which can be used to form salts of the phosphorus acids include secondary amines, preferably aliphatic and cycloaliphatic amines, containing from 10 to 36 carbon atoms. Illustrative of such amines are diamylamine, dihexylamine, di(2-ethyl-hexyl) amine, dioctylamine, didecylamine, ditetradecylamine, dihexadecylamine, dioctadecylamine, didodecylamine, dibromodioctadecylamine, isopropyloleylamine, diricinoleylamine, butylricinoleylamine, butyl-2-ethylhexylamine, dilaurylamine, methyloleylamine; ethyloctylamine, isoamylhexylamine, dicyclohexylamine, cyclohexyloctylamine, cyclohexylbenzylamine, benzyloctylamine, benzyl-2-ethylhexylamine, allyloctylamine, dodecyl-2-ethylhexylamine, (1-isobutyl - 3 - methylbutyl) - 3,3,5 - methylcyclohexylamine, di(1-isobutyl-3-methylbutyl) amine, N-n-dodecyldiethylenetriamine, N-n-tetradecyldiethylenetriamine, octylethylene diamine, N-2-ethylhexyl N-hexadecyl triethylene tetramine, heptyl trimethylene diamine, N-tetradecyl tripropylene tetramine, N,N'-diallyl trimethylene diamine, 3-hexyl-morpholine, and the like.

The method of making the mixed alkali metal-amine salts is to first prepare the full amine salt by the methods described in U.S. Patents 2,777,819, 2,858,332, 2,874,120 or 2,882,228 and thereafter treat the full amine salt in a low boiling solvent such as methanol with an alkali metal such as sodium, potassium or lithium hydroxide, carbonate, alcoholate, e.g. methylate, in an amount sufficient to replace one of the amine groups with an alkali metal. The mixture is warmed while stirring and when the reaction is complete the temperature is increased to boil off the solvent, e.g. methanol, and it may be necessary to strip the product with nitrogen to remove last traces of the solvent. An alternative method of preparing the alkali metal-amine salts such as sodium-amine phosphonate is to dissolve sodium in methanol and add the sodium methylate dropwise while stirring to a full amine salt of an alkyl phosphonic acid at 100–200° C. for ½ to 10 hours. The methanol is removed by nitrogen stripping to give a new sodium-amine phosphonate.

For example (I), 0.5 gram of sodium was dissolved in 25 ml. of methanol and this was added dropwise with stirring to $C_{18-24}$ primary alkylamine (mixture of $A_3$ of Table I) salt of monochloromethylphosphonic acid. The addition was carried out at 165° F. and required about 20 minutes after which the mixture was held at this temperature for 30 minutes. The methanol was removed with nitrogen stripping to give a clear product containing 0.11% wt. sodium.

Example II was prepared in accordance with the procedure of Example I, except that $A_3$ amine salt of trichloromethylphosphonic acid was used. The final product Na—$A_3$ amine trichloromethylphosphonate was oil soluble and possessed good extreme pressure properties.

Other examples of alkali metal-amine salts of this invention include mixed salts of Na or K with from primary amines such as $t\text{-}C_{12}H_{25}NH_2$, $t\text{-}C_{12}H_{25}NH_2$ to $t\text{-}C_{15}H_{31}NH_1$, $t\text{-}C_{18}H_{37}NH_2$ to $C_{24}H_{49}NH_2$, dimethyl neopentylcarbinyl amine, tert.tridecylamine, or with secondary amines, e.g. di-2-ethylhexylamine, di-1-isobutyl-3-methylbutylamine, didecylamine, dioctadecylamine, isopropyloleylamine, butyl-2-ethylhexylamine, dicyclohexylamine salts of trichloromethanephosphonic acid, 1,1-dichloroethanephosphonic acid, 1,1-dibromobutanephosphonic acid, trichlorobenzenephosphonic acid, tribromomethanephosphonic acid, trifluoromethanephosphonic acid, tribromomethanephosphonic acid, trichloromethanedithiophosphonic acid, chlorobenzene trichloromethanephosphinic acid, 1,1-dichloroethanethiophosphonic acid, trichlorobenzenephosphonic acid, trichloromethanephosphinic acid, dibromoethanephosphinic acid.

When used as oil improvers the new alkali metal-amine halohydrocarbyl phosphonates are particularly useful when used in combination with certain sulfurized or sulfochlorinated fats, fatty oils of the animal, vegetable and marine type and derivatives thereof, such as sulfurized or sulfo-chlorinated tallow, lard, lanolin, jojoba oil, rapeseed oil, sperm oil, fatty acids of these fats and oils as well as their esters such as $C_{14}$ to $C_{20}$ saturated and unsaturated fatty acids, e.g. myristic, stearic, oleic acids, polymerized fatty acids such as polymerized linoleic acid or "Empol 1022" which is a polymerized fatty acid made by Emery Industries; or esters such as cetyl stearate, cetyl oleate and mixtures thereof; halogenated fats, oils, waxes such as chlorinated paraffin wax, chlorinated tallow, etc. of these materials preferred are the sulfurized and/or sulfurized-chlorinated sperm oil, lanolin, rapeseed oil, oleic acid, chlorinated paraffin wax and cetyl oleate as well as mixtures thereof.

Another class of materials useful in combination with salts of this invention are oil-soluble partial esters of polyhydric alcohol and fatty acid having from 8–32 carbon atoms, preferably fatty acids having 10–20 carbon atoms, the preferred esters are those derived from polyhydroxy alcohols.

Specific esters derived from simple alkanepolyols include glycerol monooleate, glycerol monosterate, glycerol monoricinoleate, pentaerythritol monocaprylate, pentaerythritol mono- and dilaurate, pentaerythritol mono- and dioleate, pentaerythritol mono- and distearate, mono-, di-, and triethylene glycol monooleate, propylene glycol mono-ricinoleate, mono-ethylene glycol monooleate, triethylene glycol mono-stearate, sorbitol monolaurate, mannitol monooleate, mannitol dioleate, sorbitol, dioleate, etc.

Esters derived from ether-alcohols as described may be prepared by the method described in U.S. Patent 2,322,820. Examples of such esters which must contain at least one and preferably more than one free hydroxyl group are sorbitan mono- and dioleate, sorbitan mono- and dilaurate, mannitan mono- and distearate, mannitan mono- and dioleate, sorbitan mono- and dipalmitate, sorbitan sesquioleate, sorbitan mononaphthenate, mannitan monolaurate, etc.

Esters derived from the sugar alcohols include glucose monooleate, glucose monoricinoleate, sorbose monostearate, frutose monooleate and the like.

The alkali metal-amine halohydrocarbyl phosphonate alone or in combination with additives as defined are each used in amounts ranging from about 0.5% to about 5% by weight.

Certain viscosity indexes and pour point depressing agents are particularly suited for use in compositions of the present invention. Such materials are methacrylate polymers of $C_{12-18}$ alkyl alcohols such as lauryl and/or stearyl methacrylate. Such polymers are commercially available from Rohm & Haas under the trade name of "Acryloid 150 or 710." "Acryloid 710" is predominantly a copolymer mixture of octyl and lauryl methacrylates having a molecular weight of from about 10,000 to 20,000 or "Acryloid 150" which is predominantly a copolymer mixture of cetyl, lauryl and octyl methacrylates having a molecular weight of about 10,000–15,000. These polymers are sold commercially as 40% concentrate of the polymer in a mineral lubricating oil base, to provide a viscous liquid having a viscosity at 210° F. of from about 600 to 850 centistokes. On an oil-free basis the polymers when used in compositions of this invention vary from 0.001% to 5%.

Base oils to which additives of this invention are added may be selected from a variety of natural oils such as paraffinic, naphthenic and mixed base mineral oils having 250 SUS at 210° F. In addition, synthetic oils may be used such as polymerized olefins, alkylated aromatics; polyalkyl silicone polymers, e.g., liquid dimethyl silicone polymers, other silicone polymers; $H_2S$-adducts of unsaturated ethers and thioethers, e.g., $H_2S$ adduct of diallyl ether; esters, e.g., di(2-ethylhexyl) sebacate. Mixtures of natural and synthetic oils can be used.

Specific examples of compositions of this invention are:

Composition A— Percent wt.
Na·$A_3$[1] monochloromethylphosphonate _____ 3.0
Sulfurized sperm oil _____ 4.0
Pentaerythritol monooleate _____ 1.0
Methacrylate polymer (Acryloid 150) _____ 0.2
Mineral lubricating oil (100 SSU at 210° F. neut.) _____ 66.25
Bright stock (150 SSU at 210° F.) _____ 25.30

[1] $A_3$ described in Table I.

Composition B—
Na·$A_3$ trichloromethylphosphonate _____ 3.25
Sulfurized sperm oil _____ 4.0
Pentaerythritol monooleate _____ 1.0
Methacrylate polymer (Acryloid 150) _____ 0.2
Mineral lubricating oil (100 SSU at 210° F. neut.) _____ 66.25
Bright stock (150 SSU at 210° F.) _____ 25.30

Composition C—
Na·$A_3$ monochloromethyl phosphonate _____ 5
Sulfurized sperm oil _____ 4
Pentaerythritol monooleate _____ 1
Mineral oil (SAE 90) _____ Balance Composition D—
Na·$A_1$ monochloromethylphosphonate _____ 5
Sulfurized-chlorinated sperm oil _____ 4
Pentaerythritol monooleate _____ 1
Mineral oil (SAE 90) _____ Balance Composition E—
Na·$A_3$ monochloromethylphosphonate _____ 5
Mineral oil (SAE 30) _____ Balance Composition F—
K·$A_3$ monochloromethylphosphonate _____ 3.25
Sulfurized sperm oil _____ 4.0
Pentaerythritol monooleate _____ 1.0
Methacrylate polymer (Acryloid 150) _____ 0.2
Mineral lubricating oil (100 SSU at 210° F. neut.) _____ 66.25
Bright stock (150 SSU at 210° F.) _____ 25.30

The outstanding properties of compositions of the present invention are evidenced by the results as shown in Table II. The tests are CRC L–37 and L–42 described in Jour. of Inst. of Pet., August 1959, pages 219–235; 325° F. Ordinance Thermal Stability Test, N. T. Meckel and R. D. Quillian, Jr., "A Study of Gear Lubricant Thermal Oxidative Degradation Phenomena," Soc. of Automotive Engrs., Preprint T–38, presented at the SAE Annual Meeting, Detroit, January 11–15, 1960 and also described in SAE Jour., May 1960, page 60, and in Fed Std. 791, Method No. 2504T, and these tests are designed to meet MIL–L–2105A requirements and specification and wherein these tests are fully described; Continental Oxidation Test described in Anal. Chem. 20, 547, June 1948, and in the 4-Ball Extreme Pressure Tester operated for 1 minute at 1800 r.p.m. and room temperature, steel on steel described in Lubr. Eng. 1, 35–43, 1945.

TABLE II

| Test | Composition A | Composition X[b] |
|---|---|---|
| CRC L–42 | [c] 9.5 | [a,d] 8.0 |
| CRC L–37 | 8.0 | 8.0 |
| Oxidation Stability: | | |
| Ordnance 325° C. Thermal Stability: | | |
| Viscosity Increase, Percent | 52 | 133 |
| Pentane Insoluble, Percent | 2.8 | 3.93 |
| Benzene Insoluble, Percent | 0.35 | 2.33 |
| Bench Oxidation Test 325° F., 72 hrs.: | | |
| Viscosity Increase, Percent | 53 | 169 |
| Pentane Insoluble, Percent | 1.5 | 3.6 |
| Continental Oxidation Test Sludge, Mg at— | | |
| 24 hrs | 26 | 60 |
| 72 hrs | 32 | 120 |
| 4-Ball Extreme Pressure Test Weld load, Kg | 355 | 282 |

[a] About 6% tooth are scored.
[b] Composition X same as Composition A except that for the mixed Na·$A_3$-monochloromethylphosphonate

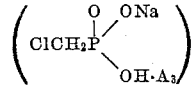

the full amine ($A_3$) salt was used; namely

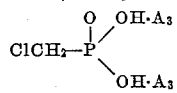

where $A_3$ is defined in Table I.
[c] The value of 9.5 obtained on seven different tests.
[d] The value of 8 was obtained on four different tests.

Compositions of this invention are applicable for high temperature, pressure and speed use as encountered in automotive and truck engines as well as various industrial equipment.

This patent application is a division of copending patent application Serial No. 36,154, filed June 15, 1960, and which matured into U.S. Patent No. 3,112,267.

We claim as our invention:
1. As a new compound Na-primary $C_{8-24}$ alkylamine salt of chloromethylphosphonic acid.
2. As a new compound Na-primary t-$C_{12-24}$ alkylamine salt of chloromethylphosphonic acid.

References Cited by the Examiner
UNITED STATES PATENTS 2,286,792  6/42  Dickey et al. _____ 260—501 X
2,777,819  1/57  Williams _____ 260—501 X
2,858,332  10/58  Watson _____ 260—501 X
2,874,120  2/59  Watson _____ 260—501 X
2,882,228  4/59  Watson _____ 260—501 X LEON ZITVER, *Primary Examiner.*